Jan. 24, 1950     H. GOLDBERG     2,495,372
REEL AND CUTTER BLADE FOR LAWN MOWERS
Original Filed Aug. 2, 1945     3 Sheets-Sheet 1
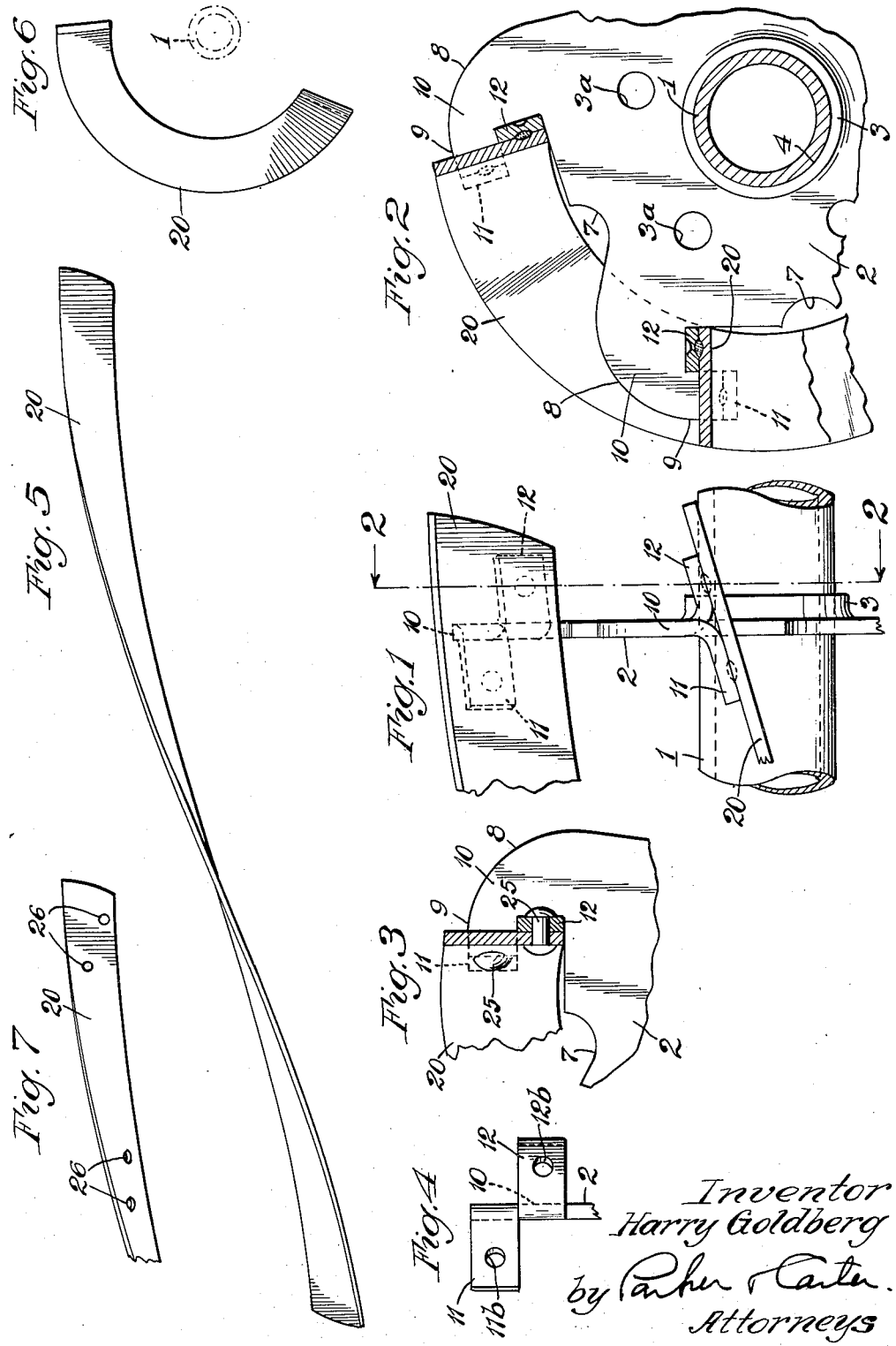
Inventor
Harry Goldberg
by Parker & Carter
Attorneys

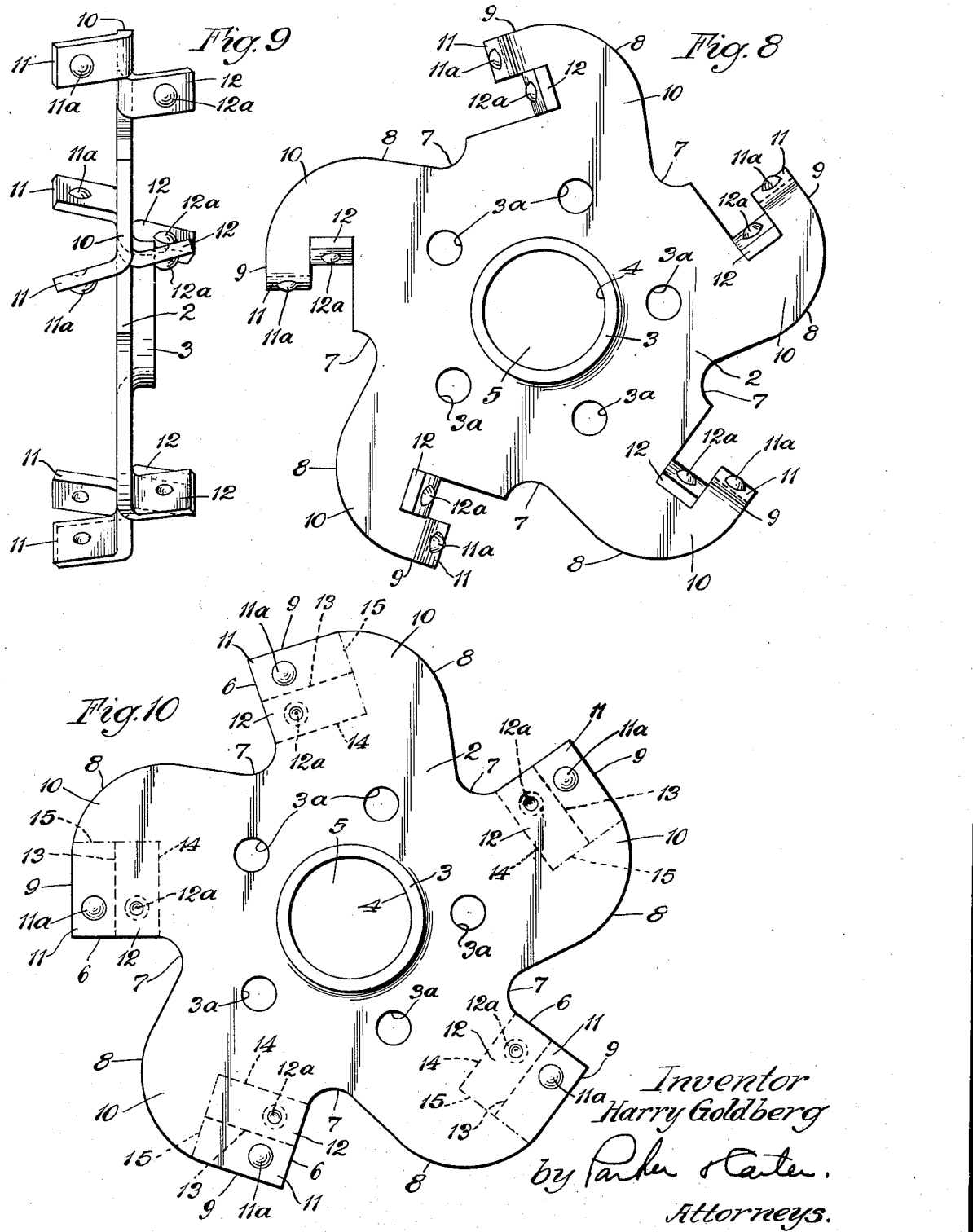

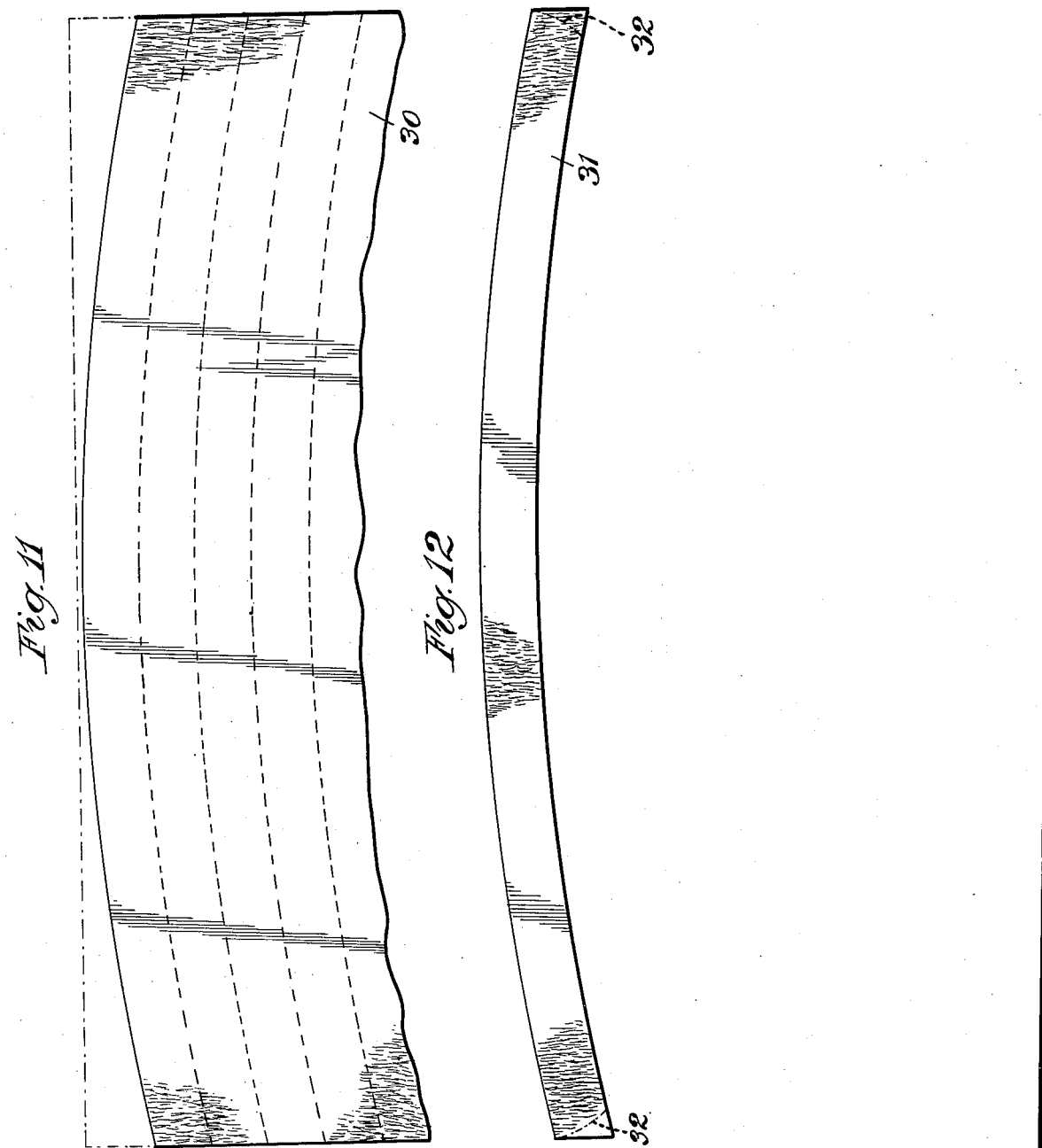

Patented Jan. 24, 1950

2,495,372

UNITED STATES PATENT OFFICE 2,495,372

REEL AND CUTTER BLADE FOR LAWN MOWERS

Harry Goldberg, Chicago, Ill., assignor to Pioneer Gen-E-Motor Corporation, Chicago, Ill., a corporation of Delaware Original application August 2, 1945, Serial No. 608,396. Divided and this application August 11, 1947, Serial No. 767,927

1 Claim. (Cl. 56—294)

The invention relates to an improvement in lawn mower reels and has for one purpose to provide an improved spider for such reels.

Another purpose is to provide an improved and simplified lawn mower reel structure and method of making it.

Another purpose is to provide improved means for making and assembling the cutter knives of the lawn mower reel.

Other purposes will appear from time to time throughout the specification and claim.

This application is a division of my copending application Serial No. 608,396, filed August 2, 1945.

The invention is illustrated more or less diagrammatically in the accompanying drawings wherein:

Figure 1 is a partial side elevation of the reel structure, illustrating the tubular shaft, blades, and spiders;

Figure 2 is a section on the line 2—2 of Figure 1;

Figure 3 illustrates a variant method of securing the blades to the spiders;

Figure 4 illustrates a detail of the spider to which the blade of Figure 3 is secured;

Figure 5 is an elevation of the blade employed in the form of Figures 1 and 2;

Figure 6 is an end elevation of the blade shown in Figure 5;

Figure 7 is an end portion of the blade employed in the form of Figures 3 and 4;

Figure 8 is a plan view of one of the spiders employed in the form of Figures 1 and 2;

Figure 9 is a side elevation of the spider structure shown in Figure 8;

Figure 10 illustrates a blank from which the spider of Figures 8 and 9 is formed;

Figure 11 illustrates a blank from which blades are formed; and

Figure 12 illustrates the blade as it is cut from the blank.

Like parts are indicated by like symbols throughout the specification and drawings.

Referring to the drawings I generally indicates any suitable axle or shaft, which may be of solid or tubular stock, but is preferably tubular. The ends of the shaft may be received in any suitable bearing means, not herein shown, in the lawn mower structure in which the reel is employed.

Spaced along the shaft are a plurality of spiders. Each spider includes a body portion 2 of flat sheet stock, preferably formed with an upset sleeve 3 having a cylindrical inner surface 4 which conforms closely to the exterior of the shaft 1. 3a indicate indexing apertures used in the assembling of the reel. The spider may be secured to the shaft by any suitable means, but it is advantageous to position the spiders at the proper position on the shaft and then to weld the sleeve 3 to the exterior of the shaft. Considering the spider blanks as illustrated in Figure 10, they may be punched from any suitable sheet stock in the form therein shown. The central aperture 5 may be punched either by the same or by a separate operation, part of the metal being upset to form the sleeve 3. It will be understood that a previous punching operation may, if desired, be employed to provide a hole from which the edge may be upset to form the sleeve 3. The blank is formed with a series of projections having generally radial lead edges 6 connected by edge portions 7 and 8, 8 being reversed and curved in relation to 7 and terminating in a generally rectilinear edge portion 9 perpendicular to the adjacent radial rectilinear portion 6. It will be understood that the actual edge contours may be widely varied. After the blank has been formed as shown in Figure 10 the corners of the arms 10 thus formed may be sheared and bent into a pair of oppositely extending flanges. The metal from which these flanges are formed is indicated as at 11, 12 in Figure 10. 13 indicates the future shear between 11 and 12. 14 indicates the future shear between the opposite side of the blank portion 12 and the adjacent part of the spider body 2. 15 is the line of fold of the two portions of the two future ear or lug portions 11, 12. Their form and position is illustrated for example in Figures 8 and 9. It will be noted that each pair of ears 11, 12 are not merely oppositely bent from the body 2 of the spider, but are bent to conform to the desired position of the later added cutting knife.

It will be realized that the blank may be formed by any suitable series of steps, the final result being indicated in Figure 8.

Assume that a series of spiders are applied to the shaft 1. They are arranged in proper angular relation to align the groups of lugs or ears 11, 12 to form a generally helically arranged set of abutments for the later added knives. The apertures 3a may be used as indexing means.

The knives 20 may be of any suitable stock and may for example be cut from strip stock, sheared to the correct length. The knives may for example be cut or sheared from the sheet stock generally indicated at 30 in Figure 11. The blades 20 may be shaped from the edge of the body 30 of strip or sheet stock by any suitable cutoff die or blade, not herein shown, which cuts from the edge of the strip stock a curved blade piece 31. There is a minimum of waste of material and no wasted material between adjacent knife pieces. The curved blade pieces 31 may have their edges cut or sheared off as at 32 by any suitable means or tool, the result being a blank, which needs no further cutting or shearing. Preferably the grain of the metal of the stock is generally perpendicular to the edge of the blade, so that the longitudinal stress is minimized. A cutting edge may be formed by any suitable means, along one edge of the knife. The knife may be twisted slightly to conform to its desired final form. When so twisted and set, it takes the form illustrated in the end view of Figure 6. In that figure the knife is illustrated as extending about a helix of about 150 degrees about the central shaft 1. The knife may be twisted or formed by any suitable means, preferably cold formed, and is preferably set permanently to its desired form or helix, before being applied to the spiders. By having the proper length of blade and the proper radius, and by spirally twisting the blade to a predetermined angle, a proper lead is established for the final reel assembly. The preformed blade conforms to the helix of the spider lugs to which the blade is later welded or otherwise secured. The spiders are so located on the shaft 1 that, upon contacting the curvature of the blade, a true lead is established.

The knife may be applied to the spiders by any suitable means. I find it advantageous to employ a jig, and to spot weld the knife to the appropriate lugs 11, 12. For convenience in welding, and to provide metal for the weld, it is advantageous to provide the lugs or ears 11, 12 with offsets or dimples or projections 11a and 12a. It is also understood that the knives may be secured to the ears by any suitable method or means such as welding, brazing or any other heat fusing. It is also practical to bolt or rivet the knives in place. In that event the dimples 11a or 12a are omitted and their place taken by rivet holes 11b or 12b through which any suitable rivets 25 may pass. In that event, as shown in Figures 3 and 7 the knife is also provided with pairs of rivet holes 26 to receive the rivets.

In considering in somewhat greater detail the process followed in assembling the spiders on the shaft, assume that the shaft 1 is in vertical position. The lowest spider is positioned at the lower end of the shaft, for example by any suitable swing fixtures or arms, which hold the lowest spider at a predetermined position on the shaft. It may then or thereafter be welded or otherwise secured to the shaft. The next spider above it is positioned at a predetermined distance upwardly along the shaft, and with a predetermined lead of the corresponding lugs. In connection with maintaining the proper lead the index apertures 3a of the spiders may be employed, or any other suitable indexing means. However, each successive spider applied to the shaft is so rotated in relation to the shaft that the corresponding sets of lugs of the various spiders continue the projection of a helix which, when the final number of spiders has been applied extends from end to end of the reel concentrically with the axis of the reel. This process is continued until all of the spiders are in position and are welded or otherwise fixed to the shaft. The sets of lugs are then each in a proper position to receive a spiral blade with a minimum of stress.

The spiral blades, which as above stated are preferably cold formed to substantially their final helix or form, are welded or otherwise secured to the proper sets of lugs. Whereas the total angle described by the helix may vary in different machines, in the particular reel structure herein shown, a total angle or lead of 150 degrees is employed. However, it will be understood that this angle is a matter of convenience and other angles may be practical especially with changes in the length of the blades.

After the blades have been welded or otherwise secured to the lugs, and the entire reel assembly is completed, the edges of the blades can thereafter be hardened by any suitable means or method. I may for example employ induction hardening. The blades may thereafter be ground to any desired form by any suitable grinding means which do not of themselves form part of the present invention.

It will be realized that whereas I have described and shown a useful device, nevertheless many changes in size, shape, number and disposition of parts may be made without departing from the spirit of the invention. I therefore wish my description and drawings to be taken as in a broad sense illustrative rather than as limiting me to my precise showing.

For example it will be understood that any suitable securing means, not herein described, may be employed for securing the spiders to the shaft and for securing the blades or knives to the spiders.

The use and operation of the invention are as follows:

In forming the lawn mower reel herein described the following parts are employed, namely; the shaft, which may be of solid or of tubular stock, a suitable number of one piece spiders, and a suitable number of knives or blades. The shafts are cut to proper length from any suitable stock. The spiders are blanked from any suitable sheet stock. The following steps may be made in various order.

(a) providing a central aperture in the blank
(b) forming a generally cylindrical sleeve surrounding said central aperture
(c) upsetting the lugs or ears 11, 12 in opposite directions
(d) perforating or dimpling the lugs.

The knives or blades may advantageously be cut from strip stock, either before or after edging. When cut to proper length they may either be initially set or twisted or may be twisted into proper position during the process of application to the ears of the spiders, the former being preferable.

The assembled parts may be secured together in various ways but it is advantageous to weld or braze or otherwise provide a fused connection between the spider sleeves 3 and the shaft 1 and between the spider lugs 11 and 12 and the knives 20. However, any other suitable securing means may be employed, such as bolting or riveting the knives to the spiders.

Note that by using a lug on both sides of each lead edge of each spider projection, the stress is distributed and in general equalized. Note also that the thrust is directly against the edge of the spider itself so that the flat body of the spider is in general perpendicular to any thrust to which it is subjected, the stress being distributed in the plane of the spider. Thus if the blade engages uncuttable material in the course of the use of the device, there is a minimum tendency to bend the spiders out of their proper planes.

By following the procedure herein described I obtain important savings in production cost while actually increasing the strength, ruggedness and simplicity of the reel assembly.

By permanently preforming the blade I obtain the result that it is not put in strain when it is secured to the spider. In fact, as a variation of my method of assembly I may employ the preformed blade to determine the position of the spiders. In that event it is possible to secure the blade to the spiders without securing the spiders to the shaft, the spider and blade unit being supplied as a separate assembly which may thereafter at a later time be secured to a shaft. Or as an alternative method I may first secure a single blade to all of the spiders, then thread the spiders on a shaft and secure them to the shaft, and thereafter secure the other blades to the spiders.

Where in the description and claim I employ the term lawn mowers and the like, it will be understood that I wish the material to be interpreted with sufficient breadth to include any cutting or grinding structures in which spiders such as herein shown may be employed.

I claim:

In a cutter reel for lawn mowers and the like, a shaft, a plurality of apertured spiders spaced therealong, each said spider having a plurality of lead projections with generally radial edges, the corresponding projections of the spiders being helically arranged, the lead edges of each projection having a plurality of lugs conforming to said helix, extending oppositely from the lead edge of each said projections of each spider, and a helical cutter blade abutting against and secured to the lugs of corresponding lead edges, the outer edges of said blades being sharpened.

HARRY GOLDBERG.

REFERENCES CITED

The following references are of record in the file of this patent:

UNITED STATES PATENTS

| Number | Name | Date |
| --- | --- | --- |
| 364,792 | Beecher | June 14, 1887 |
| 1,818,220 | Gratiot | Aug. 11, 1931 |
| 1,882,195 | Sharp | Oct. 11, 1932 |
| 2,043,098 | Funk | June 2, 1936 |
| 2,303,055 | Lardi | Nov. 24, 1942 |

FOREIGN PATENTS

| Number | Country | Date |
| --- | --- | --- |
| 389,183 | Great Britain | Mar. 16, 1933 |
| 15,210 of 1933 | Australia | June 15, 1934 |